(12) United States Patent
Martin et al.

(10) Patent No.: US 6,182,929 B1
(45) Date of Patent: Feb. 6, 2001

(54) LOAD CARRYING STRUCTURE HAVING VARIABLE FLEXIBILITY

(75) Inventors: Willi Martin, Reichertshausen; Hans-Friedrich Siegling, Egmating; Marcel Kuhn, Kaiserslautern; Norbert Himmel, Bad Kreuznach, all of (DE)

(73) Assignees: DaimlerChrysler AG, Stuttgart; Institut fuer Verbundwerkstoffe GmbH, Kaiserslautern, both of (DE)

( * ) Notice: Under 35 U.S.C. 154(b), the term of this patent shall be extended for 0 days.

(21) Appl. No.: 09/161,083

(22) Filed: Sep. 25, 1998

(30) Foreign Application Priority Data

Sep. 25, 1997 (DE) ............................................... 197 42 314

(51) Int. Cl.⁷ ....................................................... B64C 3/44
(52) U.S. Cl. .................. 244/219; 244/75 R; 416/132 R
(58) Field of Search .................. 244/75 R, 214, 244/215, 219

(56) References Cited

U.S. PATENT DOCUMENTS

| | | | | |
|---|---|---|---|---|
| 3,042,371 | * | 7/1962 | Fanti ................................. | 416/132 R |
| 3,930,626 | * | 1/1976 | Croswell ................................ | 244/44 |
| 4,471,927 | | 9/1984 | Rudolph et al. ....................... | 244/215 |
| 5,114,104 | * | 5/1992 | Cincotta et al. ....................... | 244/219 |
| 5,181,678 | * | 1/1993 | Widnall et al. ....................... | 244/219 |
| 5,366,176 | * | 11/1994 | Loewy et al. ....................... | 244/75 R |
| 5,662,294 | * | 9/1997 | Maclean et al. ....................... | 244/219 |
| 5,839,700 | * | 11/1998 | Nedderman ........................... | 244/219 |
| 5,887,828 | * | 3/1999 | Appa ..................................... | 244/215 |
| 5,931,422 | * | 8/1999 | Geiger et al. ......................... | 244/214 |
| 6,041,728 | * | 3/2000 | Goldstein et al. .................... | 114/162 |

* cited by examiner

*Primary Examiner*—Peter M. Poon
*Assistant Examiner*—Francis T. Palo
(74) *Attorney, Agent, or Firm*—W. F. Fasse; W. G. Fasse

(57) ABSTRACT

A load carrying structure having a selectively rigid or flexible characteristic includes a thermoplastic material (7) having a softening temperature above the operating temperature range of the load carrying structure, and a heating arrangement (8) provided to selectively heat the thermoplastic material to above its softening temperature. During normal operation, the thermoplastic material is in a rigid state and the overall load carrying structure is rigid to the prevailing loads. By activating the heating arrangement to heat the thermoplastic material to at least its softening temperature, the thermoplastic material and therewith the load carrying structure becomes flexible so that it may be deformed to a different configuration by applying a deforming load. Once the desired deformed configuration is achieved, the heating arrangement is deactivated, and the thermoplastic material is allowed to cool below its softening temperature so that it once again becomes rigid and rigidly fixes the new deformed configuration. The deforming force may be applied by any actuating mechanism, or for example by arranging shape memory alloys in connection with the thermoplastic material.

21 Claims, 1 Drawing Sheet

LOAD CARRYING STRUCTURE HAVING VARIABLE FLEXIBILITY

PRIORITY CLAIM

This application is based on and claims the priority under 35 U.S.C. §119 of German Patent Application 197 42 314.0, filed on Sep. 25, 1997, the entire disclosure of which is incorporated herein by reference.

FIELD OF THE INVENTION

The invention relates to a load carrying structure that has a variable flexibility, i.e. that can be selectively adjusted or actuated to be relatively rigid or relatively flexible or deformable, as needed at any time.

BACKGROUND INFORMATION

According to the state of the art, structural components that are to be connected together in a manner that is selectively rigid or flexibly movable are typically connected by a joint or hinge structure that is, in itself, flexible. In order to provide the necessary rigidity in addition to the necessary flexibility, the known structures further include a locking device that can be selectively locked or released, so as to selectively lock the flexible joint in one or more desired fixed positions, or alternatively release the joint to allow it to be flexibly bendable. The selective operation of the locking device further requires the use of a control unit for actuating the locking device. As a result, known load carrying structures that are selectively adjustable to be rigid or flexible thus require complicated joint members and locking devices, and a rather great total number of components interacting in rather complicated ways. This is especially disadvantageous in structures that are to be built according to lightweight construction techniques, for which the primary goal is naturally a minimization of the overall weight together with a reduction of the number of components.

SUMMARY OF THE INVENTION

In view of the above, it is an object of the invention to provide a simply constructed, lightweight, load carrying structure that can be selectively adjusted, set, or actuated to be either rigid or flexible as needed at any time. The invention further aims to avoid or overcome the disadvantages of the prior art, and to achieve additional advantages, as apparent from the present description.

The above objects have been achieved in a load carrying structure that can be selectively actuated to be rigid or flexible, according to the invention, comprising a thermoplastic material having a softening temperature above the operating temperature range of the load carrying structure, and a heating arrangement adapted to heat the thermoplastic material to a temperature at or above the softening temperature. Thereby, when the load carrying structure is being used under its normal operating conditions, the thermoplastic material is rigid, and when the heating arrangement is actuated to heat the thermoplastic material to at least its softening temperature, the rigid condition is released and the thermoplastic material becomes flexible. As a result, the load carrying structure can be made selectively rigid or flexible. Throughout this specification, the term "rigid" refers to a non-softened solid state of the material, in which the material has its normal rigidity and strength adequate for withstanding the loads expected to arise during its operation without yielding or permanently deflecting or deforming. The term "rigid" is not intended to be limited to absolute rigidity and is intended to allow for some elastic strain of the material and the structure.

According to the invention, the load carrying structure is at least partially made of the thermoplastic material. If the overall load carrying structure essentially consists of the thermoplastic material and the heating arrangement, then the overall load carrying structure can be made selectively rigid or flexible as described above. On the other hand, the thermoplastic material member may be a joint member that interconnects two other rigid components of the overall load carrying structure. In this manner, the thermoplastic material member simply acts as a selectively flexible joint.

The invention provides a variably flexible structure with an integrated selective releasing and locking function, in a very simple manner. When the heating arrangement heats the thermoplastic material to a temperature at or above the softening temperature, the rigid condition is released or overcome, so that the thermoplastic material element and the overall load carrying structure becomes flexibly movable into a new position or configuration. After the heating arrangement is switched off and the thermoplastic material cools down to the normal operating temperature below the softening temperature, the thermoplastic material again becomes rigid, whereby the new position or configuration is rigidly fixed. The invention achieves this without requiring any additional locking mechanism.

The invention thus deviates from the previously known concepts that require selectively rigid or movably adjustable load carrying structures to have a complicated multi-component construction. In comparison, the load carrying structure according to the invention is characterized by a functional integration and component integration that is enabled by the selectively actuatable stiffness of the thermoplastic material. Moreover, the load carrying structure according to the invention requires only a small adjusting or deflecting force for achieving a change in configuration once the thermoplastic material has been softened.

The thermoplastic material used according to the invention is preferably a thermoplastic synthetic polymer or plastic. In this context, high-melting synthetic thermoplastics such as polyether ether ketones (PEEK) or polyether sulfones (PES) are generally preferred, because these materials have a relatively high softening temperature and thus make it possible for the load carrying structure incorporating such materials to operate at a corresponding high operating temperature.

The load carrying structure according to the invention can be particularly constructed in various ways. For example, the load carrying structure may be made entirely of the thermoplastic material along with the heating arrangement. In other words, according to this alternative, the load carrying structure essentially consists of a thermoplastic material element together with the heating arrangement. On the other hand, the load carrying structure according to the invention may, for example, comprise two or more components that are interconnected by the thermoplastic material element. In this case, the other components that are to be joined preferably have a softening temperature that lies above the softening temperature of the thermoplastic material, so that the components do not undergo softening. In this context, the other components can be made of metal, and particularly a light metal or alloy, or may be made of a synthetic plastic and especially a fiber-reinforced synthetic composite material that has a higher softening temperature than the thermoplastic material that connects or joins these other components.

In the second case, namely in which the load carrying structure comprises a plurality of components that are interconnected by a thermoplastic material element, the thermoplastic element provides a rigid connection or joining of the components at normal operating temperatures below the softening temperature of the thermoplastic material. Then, when it is desired to release the rigid connection of the components, it is simply necessary to heat the thermoplastic material up to the softening temperature using the heating arrangement, whereupon the joint becomes flexible.

Since the thermoplastic material can be deformed in any desired manner after it is heated to at least its softening temperature, the flexibility or reconfigurability of the load carrying structure can be carried out in many very different embodiments. For example, in an embodiment in which the load carrying structure comprises a plurality of rigid components that are connected together by the thermoplastic material, after heating the thermoplastic material to the softening temperature the thermoplastic material can be subjected to a thrust load, i.e. a tensile or compression load, in order to slidingly displace the rigid components relative to each other, or the thermoplastic material can be subjected to a bending load in order to bendingly deflect the rigid components relative to each other, or the thermoplastic material may be subjected to a torsion load in order to torsionally or rotationally displace the rigid components relative to each other. Thus, as can be seen, the softened thermoplastic material can be used to form a thrust joint, a bending joint, or a torsion joint, for example.

Due to the above mentioned great variability in the possible embodiments of the overall load carrying structure, a great number of applications for the inventive load carrying structure exist, especially in the field of lightweight construction. For example, the inventive load carrying structure can be used in any application in which a component that is stiff against bending or torsion during operation must have an outer geometry or configuration that is adaptively adjustable to various operating conditions, without requiring complicated joints or other mechanisms to achieve this.

By softening the thermoplastic material at its softening temperature, the stiffness of the load carrying structure can thereby be reduced as required in order to then be able to deform the structure or to slidingly or otherwise displace the interconnected components relative to each other, while exerting only a relatively small force on the structure. Then, by cooling the thermoplastic material to a temperature below the softening temperature, the stiffness will again be increased, whereby the deformed or newly established geometry can be maintained without any further or permanent application of force. In this manner, the displaced components can again be locked rigidly to each other in the newly established position, without requiring a complicated locking mechanism. This process can be carried out reversibly and repeatedly practically as often as desired over the life of the structure.

The thermoplastic material can be in any desired form. For example, it can be in the form of a planar plate, a block, a layer, a rod having a round or quadratic cross-section for example, or any other body having a shape or configuration as desired or required for any particular application.

According to one embodiment, the load carrying structure comprises a sandwich composite structure. In other words, the thermoplastic material forms a core layer that is arranged between two outer layers made of a material that is rigid at the softening temperature of the thermoplastic material. This relatively rigid material of the outer layers may, for example, be a metal and especially a light metal or alloy, or a synthetic plastic and especially a fiber reinforced synthetic plastic composite having a correspondingly high softening temperature or decomposition or dissociation temperature. The outer layers forming cover layers can have a planar plate-like configuration, or some other configuration such as concentrically arranged pipes or tubes with the thermoplastic material arranged therebetween.

In the event that such a sandwich structure is to be subjected to a bending load, however, then the outer layers, i.e. the layers that remain relatively rigid at the softening temperature of the thermoplastic material, must themselves have a sufficient flexibility. In other words, these layers are made of a material that does not undergo softening at the softening temperature of the thermoplastic material, but has a sufficient degree of elastic flexibility to satisfy the requirements at hand. Generally, the outer layers are made of a solid full-density material, especially if the thermoplastic material is to be heated to a fully plastic condition. In this case, the outer layers serve to enclose or encase the thermoplastic material. Alternatively, the outer layers may be made of a porous material, such as an expanded metal mesh or the like, for example.

The heating arrangement for heating the thermoplastic material can comprise an electrical resistance heater comprising heating wires embedded in the thermoplastic material. In order to allow the thermoplastic material to be flexibly deformed, the heating wires in this context are configured or arranged to allow the necessary loading and deformation that takes place when the load carrying structure is deformed after softening of the thermoplastic material. For example, the heating wires are arranged in a spiral, zig-zag, or serpentine configuration in the thermoplastic material.

Instead of an electrical resistance heater, the heating arrangement can alternatively comprise a contact heater, a convection heater, a high frequency induction heater, or a radiation heater. In the case of using a high frequency induction heater, a high frequency coil is arranged around the thermoplastic material, and the thermoplastic material itself consists of a polymer having appropriate dielectric characteristics, and/or metal particles or other electrically conducting particles are embedded in the thermoplastic material, for example, to achieve the necessary high frequency induction heating.

In order to transition the load carrying structure from the rigid state into the flexibly movable state, it is not necessary to heat the entire thermoplastic material to the softening temperature. Instead, only the inner region of the thermoplastic material, or one outer surface layer zone or both outer surface layer zones of the thermoplastic material may be heated to the softening temperature. The arrangement is simply so designed that the structure no longer has the necessary strength and rigidity to withstand the reconfiguring force once the respective portion of the thermoplastic material has been softened.

Since the heat loss will be less in the case of heating the inner portion of the thermoplastic material, this alternative is generally preferred. This alternative is very suitably carried out by embedding the electrical resistance heating wires directly in the thermoplastic material. On the other hand, the radiation heater, contact heater, or convection heater is, for example, used if the structure is to be heated from the outside, i.e. so as to heat the outer surface layer portions of the thermoplastic material to the softening temperature.

In the embodiments in which only the outer surface layer portions or only the inner portion of the thermoplastic material is heated, then the respective remaining inner portion or surface layer portions that have not been heated will remain in the rigid non-softened condition. Thus, when the thermoplastic material is deformed after the respective softened portion(s) thereof have been softened, the remaining non-softened portion(s) will undergo an elastic deformation or respective sliding displacement relative to each other due to the application of the adjusting force. Thereby, the remaining non-softened portion(s) will serve to provide the configuration of the material portion(s) that was(were) softened and is(are) then again rigidified by cooling, and will serve to provide the necessary return force for later returning the material into its original un-deformed solid state.

An alternative possibility for carrying out a deformation or for introducing the force necessary for achieving such a deformation is provided by arranging at least one element made of a shape memory alloy in cooperation with the thermoplastic material. The shape memory alloy will serve to deform the load carrying structure upon heating the thermoplastic material to its softening temperature. The one or more shape memory alloy elements arranged on, in, together with, or connected to the thermoplastic material may be embodied in any desired manner, for example in the form of strips, plates, wires, or rods. These elements may also be arranged as desired either within the thermoplastic material or on its outer surfaces. For example, the structure may comprise a sandwich composite structure in which the outer layers consist of a shape memory alloy while the core or intermediate layer consists of the thermoplastic material.

Shape memory alloys can be actuated by applying thermal or electrical energy thereto, so as to heat the respective shape memory alloy. This heating causes the shape memory alloy to transition from the martensitic phase into the austenitic phase. After this transition, at the so-called $A_S$ temperature, these alloys "remember" and return to their respective original un-deformed shape without any external application of a deforming force. To the contrary, the shape-return deformation exerts a force. As a result, these shape memory alloys can be used as displacement actuators. In technically useful shape memory alloys the maximum $A_S$ temperature lies in the range from 120° C. for an alloy of Ni—Ti to 170° C. for an alloy of Cu—Al—Ni. On the other hand, the $M_f$ temperature designates the temperature at which a 100% transformation to martensite occurs.

In the above mentioned sandwich structure of shape memory alloy outer layers and a thermoplastic material core layer, it is possible to tune or optimize the material and the geometry of the shape memory alloy cover layers and of the thermoplastic material core to the requirements of any particular application. By such optimization, it is possible to achieve a control of the deformation and restiffening of the structure or locking of the structure in a deformed configuration solely by means of the convection or conduction heat of the thermoplastic material of the inner layer or layers.

In this context, a thermoplastic material having a melting temperature of greater than 200° C. is used, for example. A requirement is that the thermoplastic material of the core already provides a sufficient thrust stiffness upon cooling down to below the $A_S$ temperature in order to prevent a reversal or return of the deformation effect of the shape memory alloy. In other words, the thermoplastic material of the inner layer or core must have a softening temperature and a rigidification or solidification temperature that are respectively high enough so that when the thermoplastic material is heated up it only begins to soften above the $A_S$ temperature of the shape memory alloy, and when it is cooling down it is already rigidified upon reaching the $M_f$ temperature of the shape memory alloy. This can be achieved by an appropriate selection of both the thermoplastic material and especially also the shape memory alloy having a correspondingly broad hysteresis characteristic.

In view of the above considerations, it is apparent that the invention provides a load carrying structure with a lightweight construction and with an integrated joint function, whereby the joint can be selectively flexibly released or locked, depending on whether the thermoplastic material is heated up to at least its softening temperature by switching on the heating arrangement or is allowed to cool to below its softening temperature by switching off the heating arrangement. The load carrying structure according to the invention is thus broadly applicable in many fields, and especially in the fields of motor vehicle construction and aircraft construction wherever a joint or structure having variable flexibility is needed.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
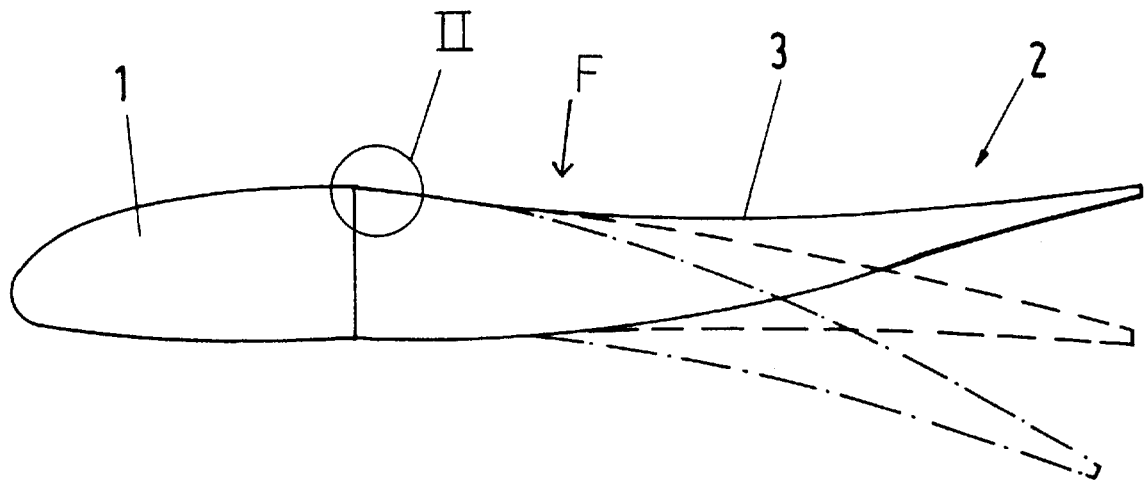
FIG. 1 schematically represents a cross-section through a landing flap of the wing of an aircraft.

As shown in FIG. 1, the landing flap F of an aircraft wing comprises a forward portion 1 and a trailing edge portion 2 joined onto the forward portion in an aerodynamically streamlined manner. While the forward portion 1 may be substantially rigid, it is desired that the trailing edge portion 2 should be selectively flexibly deflectable both upward and downward relative to the forward portion. To achieve this, the trailing edge portion 2 comprises a cover skin 3 that is secured to the forward portion 1 at the upper surface of the flap F. The bottom cover skin of the trailing edge portion 2 may or may not be fixedly connected to the forward portion 1 so as to respectively form a rigid connection between the two portions 1 and 2 or a selectively flexible hinge joint connection between the two portions 1 and 2 in the detail area II, as desired.

In any event, the trailing edge portion 2 is so constructed that it can be bendingly or flexibly deflected between a maximum upward deflected position shown by solid lines, through an intermediate substantially horizontal position shown with dashed lines, to a maximum downwardly deflected position shown with dash-dotted lines. The bending deflection of the trailing edge portion 2 of the flap F can be carried out to any desired degree using a mechanical actuator or actuator mechanism that is not shown, but can be configured in any known fashion.

Figure 2A:
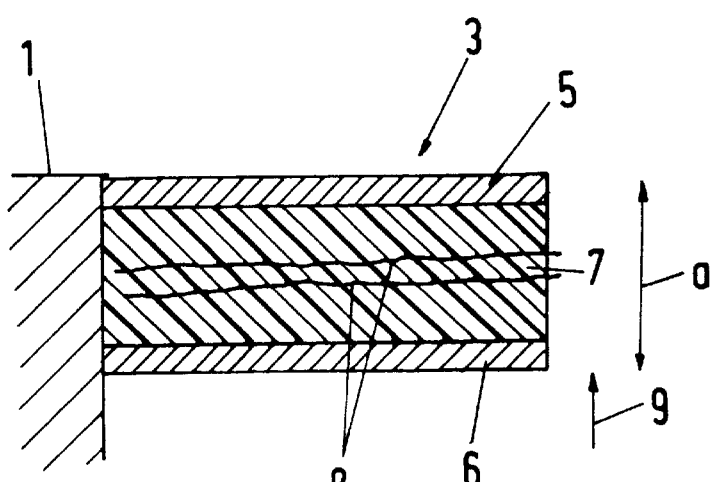
FIG. 2A shows an enlarged cross-section of the detail area II in FIG. 1, showing the outer skin of the landing flap in a substantially horizontal or un-deflected condition.
Figure 2B:
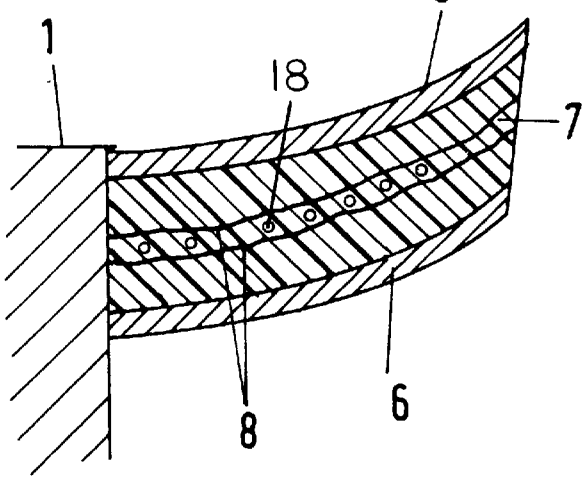
FIG. 2B is a view corresponding to that of FIG. 2A, but showing the outer skin of the landing flap in a condition deflected upward from horizontal.

FIGS. 2A and 2B show the detail area II of FIG. 1, whereby it is seen that the cover skin 3 has a multi-layered sandwich structure consisting of two outer layers 5 and 6 that are made of a metal or a synthetic plastic for example, and an inner core layer 7 made of a thermoplastic material.

The interior of the trailing edge portion 2 may simply be a hollow space enclosed by the cover skins 3, or may comprise a flexible foam core and/or span-wise support spars and/or flexible support ribs as desired.

The thermoplastic material of the core layer 7 has a softening temperature that is substantially above the operating temperature to which the landing flap F is subjected during any flight operating conditions. Thus, during normal operation, the thermoplastic material of the core layer 7 is in a non-softened rigid condition or physical state, in which it provides a sufficient strength and stiffness for the trailing edge portion 2 of the flap F. In order to achieve this, the thermoplastic material of the core 7 may comprise reinforcing fibers embedded in a thermoplastic matrix material. The outer cover layers 5 and 6 are made of full density solid materials and have a sufficient bending strength and torsional strength to withstand all operational loads applied to the landing flap F. More particularly, in view of the sandwich composite construction, since the two outer cover layers 5 and 6 are spaced apart from each other by the spacing "a" with the core layer 7 therebetween, the outer cover layers 5 and 6 in the resulting sandwich structure provide a sufficient bending strength and bending stiffness to withstand the arising loads.

Electrical resistance heating wires 8 are embedded within and extend through the inner core layer 7. The wires 8 are connected to a source of electrical power through a proper controller, such that a current can be selectively passed through the wires 8 to resistively heat the thermoplastic material, or at least an inner portion thereof, to its softening temperature. Once the thermoplastic material, or at least an inner portion thereof, reaches at least the softening temperature, the thermoplastic material is correspondingly softened, the core layer 7 becomes flexible, and accordingly the overall sandwich structure of the cover skin 3 becomes flexible and is no longer sufficiently rigid to maintain a locked or fixed configuration. At this time, the actuator mechanism, which is not shown, is actuated to apply a deflecting force in the direction of arrow 9 so as to move the trailing edge portion 2 from a substantially horizontal position into an upward deflected position. Thereby the cover skin 3 over substantially the entirety of the trailing edge portion 2 or especially in the detail area II is flexibly bent upward from the configuration shown in FIG. 2A into the configuration shown in FIG. 2B.

After switching off the heating arrangement 8, the thermoplastic material of the inner core layer 7 again becomes rigid in the new configuration, and provides a sufficient rigidity to maintain the cover skin 3 in the new configuration or geometry. To achieve this, it is simply necessary to maintain application of the deflecting force in the direction of arrow 9 until the thermoplastic material has completed its transition from the softened phase into the rigid solid phase. Thereafter, the deflecting force no longer needs to be maintained, because the again-prevailing full stiffness of the inner core layer 7 serves to fix the deformed geometry and serves to provide sufficient total structural stiffness of the trailing edge portion 2.

In order to accelerate the cooling of the thermoplastic material, and thereby accelerate the regaining of full stiffness of the inner core layer 7, cooling elements 18 can also be embedded within the thermoplastic material of the core layer 7. These cooling elements 18 may comprise thermoelectric elements, cooling tubes conveying a cooling fluid therethrough, or heat pipes serving to transport the excess heat out of the core layer 7. In this manner, the rigidification of the softened thermoplastic material can be accelerated.

While FIG. 1 illustrates an example of a flap F of an aircraft wing, the inventive load carrying structure can similarly be applied to any aircraft airfoil, such as an entire wing overall, to provide a selective flexible deformability of at least a portion of the airfoil for achieving control deflections or aerodynamic trimming or the like.

As a further variation, one or both of the outer layers 5 and 6 can be made of a shape memory alloy having proper transition temperatures relative to the softening temperature of the thermoplastic material to achieve the desired deflected configurations. For example, the bottom outer layer 6 may have a "memorized" shape corresponding to that shown in FIG. 2B so that when the thermoplastic material of the core layer 7 is heated, the bottom outer layer 6 springs to its corresponding memorized upwardly deflected shape and thus deflects the entire cover skin 3 upward.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A load carrying structure adapted to be selectively rigid or flexibly reconfigurable, comprising
    a thermoplastic material that has a softening temperature greater than a maximum operating temperature of said structure and that is in a flexible softened state at and above said softening temperature and in a rigid state below said softening temperature, and
    a heating arrangement arranged and adapted to heat at least a portion of said thermoplastic material to at least said softening temperature so as to soften said portion of said thermoplastic material into said softened state,
    wherein said structure is rigid when said heating arrangement is not operating and said thermoplastic material is in said rigid state at a temperature below said softening temperature, and
    wherein said structure is flexibly reconfigurable when said heating arrangement is operated to heat at least said portion of said thermoplastic material to at least said softening temperature so as to soften said portion of said thermoplastic material into said softened state.

2. The structure according to claim 1, wherein said portion of said thermoplastic material adapted to be heated to at least said softening temperature is an internal portion of said thermoplastic material, and said heating arrangement is so arranged and adapted to heat said internal portion without heating an outer portion of said thermoplastic material to at least said softening temperature.

3. The structure according to claim 1, wherein said portion of said thermoplastic material adapted to be heated to at least said softening temperature comprises at least one surface layer portion of said thermoplastic material, and said heating arrangement is so arranged and adapted to heat said at least one surface layer portion without heating an internal portion of said thermoplastic material to at least said softening temperature.

4. The structure according to claim 1, further comprising two layers of a second material that is in a non-softened solid state at said softening temperature of said thermoplastic material, wherein said thermoplastic material is arranged sandwiched between said two layers of said second material.

5. The structure according to claim 4, wherein said two layers of said second material and said thermoplastic material are respectively substantially planar layers.

6. The structure according to claim 4, wherein said two layers of said second material are respective concentrically arranged cylindrical layers with said thermoplastic material arranged annularly concentrically therebetween.

7. The structure according to claim 1, wherein said thermoplastic material comprises a thermoplastic matrix and reinforcing fibers embedded in said matrix.

8. The structure according to claim 1, wherein said thermoplastic material comprises a polyether ether ketone (PEEK).

9. The structure according to claim 1, wherein said thermoplastic material comprises a polyether sulfone (PES).

10. The structure according to claim 1, wherein said heating arrangement comprises electrical resistance heating wires embedded in said thermoplastic material.

11. The structure according to claim 10, wherein said heating wires are arranged in one of a spiral configuration, a zig-zag configuration and a serpentine configuration in said thermoplastic material.

12. The structure according to claim 1, wherein said heating arrangement comprises electrical resistance heating wires arranged on a surface of said thermoplastic material.

13. The structure according to claim 1, wherein said heating arrangement comprises at least one of a contact heater, a radiative heater, a convection heater, and a high frequency induction heater arranged externally of said thermoplastic material and adapted to convey heating energy into at least said portion of said thermoplastic material.

14. The structure according to claim 1, further comprising at least one flexible cooling element selected from the group of cooling fluid conveying tubes, thermoelectric cooling elements, and heat pipe tubes, embedded in said thermoplastic material.

15. The structure according to claim 1, further comprising an element consisting of a shape memory alloy arranged operatively connected to said thermoplastic material, wherein said shape memory alloy has a shape memory characteristic such that said element will change its shape and deform said thermoplastic material and said structure when said heating arrangement heats at least said portion of said thermoplastic material to at least said softening temperature.

16. The structure according to claim 15, wherein said thermoplastic material has a solidification temperature at which said thermoplastic material rigidifies upon cooling from said softened state to said rigid state, and wherein said shape memory characteristic of said shape memory alloy comprises an $A_S$-temperature below said softening temperature of said thermoplastic material and an $M_f$-temperature below said solidification temperature of said thermoplastic material.

17. The structure according to claim 15, wherein said shape memory alloy comprises one of a Ni—Ti alloy and a Cu—Al—Ni alloy.

18. The structure according to claim 1, wherein said structure is at least a selectively rigid or flexibly deformable part of an aircraft airfoil, wherein said thermoplastic material forms a core layer, wherein said heating arrangement comprises an electrical resistance heating wire embedded in said thermoplastic material, and further comprising two outer layers arranged with said core layer sandwiched therebetween to form a sandwich composite cover skin of at least said part of said aircraft airfoil.

19. The structure according to claim 18, wherein said two outer layers respectively consist of at least one of a metal and a fiber reinforced composite material.

20. The structure according to claim 1, wherein said thermoplastic material is included in a joint member that is selectively rigid or flexibly deflectable, further comprising two rigid components, wherein said joint member is connected to and joins together said two rigid components.

21. A method of using the load carrying structure according to claim 1, comprising the following steps:
   a) providing said load carrying structure in a first shape configuration;
   b) maintaining said thermoplastic material in said rigid state by maintaining a temperature of said thermoplastic material below said softening temperature, and thereby maintaining said load carrying structure in said first shape configuration;
   c) energizing said heating arrangement so as to heat at least said portion of said thermoplastic material to at least said softening temperature so as to soften said portion of said thermoplastic material into said flexible softened state and thereby make said load carrying structure flexibly reconfigurable;
   d) applying an actuating force to said load carrying structure so that, after said step c), said load carrying structure is deformed and reconfigured from said first shape configuration to a different second shape configuration;
   e) de-energizing said heating arrangement; and
   f) when said load carrying structure is in said second shape configuration, cooling said thermoplastic material to below said softening temperature so as to rigidify said portion of said thermoplastic material into said rigid state and thereby make said load carrying structure rigid so as to maintain said load carrying structure in said second shape configuration.

* * * * *